US005406047A

United States Patent [19]

Katschinski et al.

[11] Patent Number: 5,406,047

[45] Date of Patent: Apr. 11, 1995

[54] PLASMA TORCH FOR MELTING MATERIAL TO BE PROCESSED IN A CONTAINER AND FOR MAINTAINING THE MATERIAL AT THE REQUIRED TEMPERATURE

[75] Inventors: Ulrich Katschinski, Mülheim; Friedrich Greilinger, Aachen; Klaus Giertz, Bochum; Hans J. Bebber, Mülheim, all of Germany

[73] Assignee: Mannesmann Aktiengesellschaft, Dusseldorf, Germany

[21] Appl. No.: 50,221

[22] PCT Filed: Oct. 29, 1991

[86] PCT No.: PCT/DE91/00848

§ 371 Date: Dec. 13, 1993

§ 102(e) Date: Dec. 13, 1993

[87] PCT Pub. No.: WO92/08335

PCT Pub. Date: May 14, 1992

[30] Foreign Application Priority Data

Oct. 30, 1990 [DE] Germany .......................... 40 34 731.1

[51] Int. Cl.[6] .............................................. B23K 10/00

[52] U.S. Cl. .......................... 219/121.52; 219/121.36; 219/121.37; 219/121.48; 373/18; 373/22

[58] Field of Search ...................... 219/121.52, 121.36, 219/121.37, 121.38, 121.57, 121.54, 75, 121.48; 313/231.21, 231.31; 373/18-25

[56] References Cited

U.S. PATENT DOCUMENTS

| | | | |
|---|---|---|---|
| 3,242,305 | 3/1966 | Kane et al. | 219/75 |
| 3,250,893 | 5/1966 | Nestor | 219/121.52 |
| 4,018,973 | 4/1977 | Paton | 13/9 |
| 4,766,286 | 8/1988 | Iceland | 219/121.52 |
| 4,788,408 | 11/1988 | Wlodarczyk et al. | 219/121.49 |
| 4,896,016 | 1/1990 | Broberg et al. | 219/121.5 |
| 4,902,871 | 2/1990 | Sanders et al. | 219/121.49 |
| 5,206,481 | 4/1993 | Rossner et al. | 219/121.48 |

FOREIGN PATENT DOCUMENTS

| | | |
|---|---|---|
| 0176004 | 9/1985 | European Pat. Off. . |
| 9006666 | 6/1990 | WIPO . |

*Primary Examiner*—Mark H. Paschall
*Attorney, Agent, or Firm*—Cohen, Pontani, Lieberman, Pavane

[57] ABSTRACT

The invention is directed to a plasma torch which projects into a container and is fastened at a supporting device and has a nozzle arranged at a burner lance, as well as a main electrode pipe with a main electrode arranged inside the burner lance, gaseous and liquid media as well as electric current being supplied to the main electrode via coaxially arranged pipes. An annular insulating member (21) is provided around the main electrode (10) in the region of its foot end and encloses the electrode (10) annularly, the casing (33) of the double-walled burner lance (30) which is held by the supporting device being fastened at this insulating member.

12 Claims, 3 Drawing Sheets

PLASMA TORCH FOR MELTING MATERIAL TO BE PROCESSED IN A CONTAINER AND FOR MAINTAINING THE MATERIAL AT THE REQUIRED TEMPERATURE

BACKGROUND OF THE INVENTION

1. Field of the Invention

The invention concerns a plasma torch which projects into a vessel or container and is fastened at a supporting device and has a nozzle arranged at a burner lance, as well as a main electrode pipe with a main electrode arranged inside the burner lance, gaseous and liquid media as well as electric current being supplied to the main electrode via coaxially arranged pipes, wherein an annular insulating member is provided around the main electrode in the region of its foot end and encloses the electrode annularly, the outer wall or casing of the double-walled burner lance which is held by the supporting device being fastened at this insulating member, specifically for plasma torches with or without ignition lance.

2. Description of the Prior Art

Plasma torches are subjected to high thermal loading when used in containers. The main electrode is substantially acted upon thermally by electric current heat, while the casing of the burner lance is subjected to heat particularly from the melting bath, the furnace wall and the heat radiated from the arc. The resulting changes in temperature in the work materials cause considerable changes in length of the structural component parts.

A relative axial displacement of the main electrode and nozzle is caused particularly as a result of individual structural component parts of the plasma torch being acted upon thermally to varying degrees. These changes have a negative effect on the formation of the plasma arc. In plasma torches provided with ignition electrodes, comparable changes in length occur between the ignition electrode and the main electrode.

It is known from DE-OS 29 00 330 to cool the individual structural component parts of a plasma torch, namely the ignition electrode, the main electrode and the nozzle, independently of one another.

The plasma torch known from DE-OS 29 00 330 is not only expensive to produce, but also has hardly any influence on the set of problems relating to the relative displacement of the individual cooling structural component parts, since the lances are fixed in each instance at the portion of the burner remote of the melt. The individual lances can expand along their entire length with the result that the greatest axial displacements are to be found precisely in the critical region of the main electrode and nozzle.

A plasma torch is known from U.S. Pat. No. 3,463,957 in which the main nozzle and the main electrode are fixed in the region of the tip of the nozzle and are moreover connected to a common cooling water system.

The plasma torch known from this U.S. Patent is used for flame-cutting metal. Plasma torches of this type have no burner lances subjected to high heat radiation precisely when used in containers so as to result particularly in longitudinal expansion.

A plasma torch is known from DE 38 40 485 in which the ignition lance pipe is positioned within the main electrode pipe by centering sleeves. These centering sleeves serve for electric insulation and are therefore manufactured from plastic.

The plasma torch known from DE 38 40 485 forms a unit combining the ignition electrode and the ignition electrode pipe, which is not displaceable at the end remote of the ignition electrode.

It is the object of the present invention to provide a plasma torch which has a simple constructive design, operates in a reliable manner and with low maintenance when used at high temperatures and allows an adjustable, constant formation of the plasma arc.

This object is met by the invention in the characterizing part of claims I and 11.

Without recourse to a prototype, the present Inventor suggests a two-point bearing support of individual structural component parts of the plasma torch. In so doing, the structural component part which is thermally loaded to the highest degree, and accordingly also subject to the greatest changes in length of the structural component parts, acts as the supporting member. In the plasma torch according to the invention, this is the casing of the burner lance, whose foot end is held by the supporting device. The head end of the casing projecting into the furnace container forms the fixed point for the rest of the structural component parts.

one of these structural component parts is the main electrode pipe, the main electrode being fastened to its head end. The head end of the main electrode pipe is fixedly connected with the head end of the casing by means of an insulating member and forms the stationary bearing of the main lance. The foot end of the main lance is constructed as a movable bearing. As a result of this type of bearing support, the change in length of the structural component parts brought about by the thermal expansion can proceed without tension.

The sliding elements of the movable bearing of the main electrode pipe are constructed in such a way that a reliable transmission of the electric current is ensured. Contact springs which enclose the electrode pipe in the form of a bush are particularly suited to this purpose.

The water guidance arrangement of the plasma lance is constructed in such a way that fresh coolant is guided from the supporting device to the main electrode pipe and from there, in the interior of the pipe, to the main electrode. In the interior of the main electrode, the coolant is guided to the surfaces which are thermally loaded to the highest degree and after leaving the electrode is guided directly to the nozzle ring via overflows.

After suitable water guidance in the nozzle, the cooling water is guided back to the supporting device in the double-casing of the electrode lance.

Obviously, the necessary insulation is provided between the structural component parts of the burner. In the present invention, the insulation has been incorporated in the fixed point between the electrode and nozzle ring.

Plasma torches with ignition electrodes have their own bearing system with stationary and movable bearings for the ignition electrode. The fixed point is formed in the head region of the ignition electrode by an insulating bush.

Cooling water flows around the ignition electrode pipe over its entire length. During operation it is additionally cooled by gas flowing in the interior of the ignition lance. The change in length which occurs due to the current-generated heat in spite of the intensive cooling are absorbed by sliding elements arranged at the foot end of the ignition electrode pipe.

A quick-closing mechanism in which the media feed lines are arranged is arranged at the supporting arm for holding the plasma torch. The quick-closing mechanism is constructed so as to enable a simple and quick exchange of the plasma torch. The media feed lines from the supporting device and from the burner lance are adapted to one another and after closing the quick-closing mechanism ensure a reliable, trouble-free feed of gaseous and liquid media and electric current.

BRIEF DESCRIPTION OF THE DRAWINGS

An embodiment example of the invention is shown in the drawings.

DESCRIPTION OF THE PREFERRED EMBODIMENTS

Figure 1:
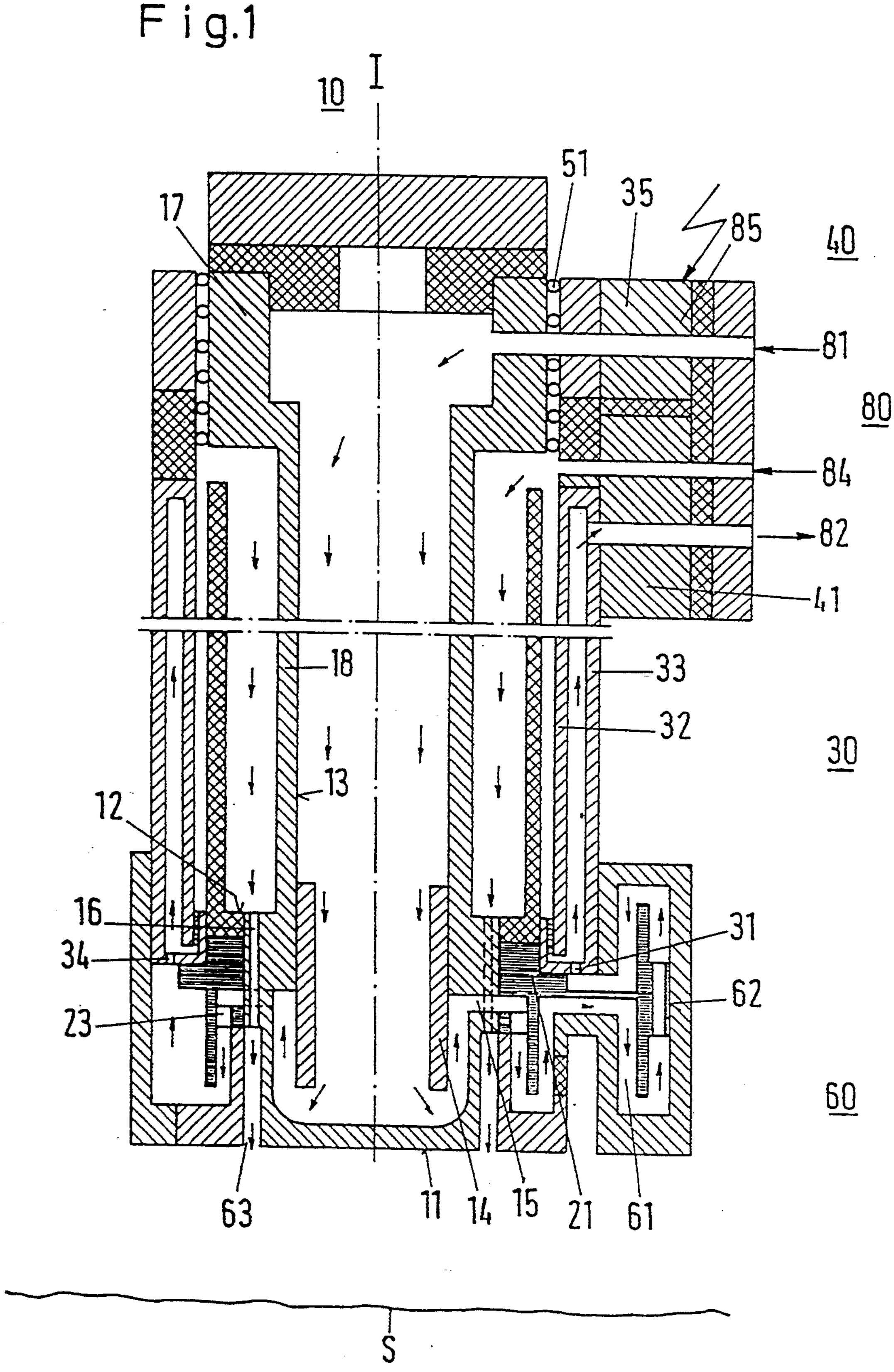
FIG. 1 shows the section through a plasma torch without ignition lance.

FIG. 1 shows the essential structural component parts of the plasma torch schematically, specifically the head part 11 facing toward the melt S, a main electrode 10, and the foot part 17 which can be fastened to a supporting device 40 (not shown in the drawing). The head part 11 of the main electrode 10 is constructed as a pot, the base of the pot facing toward the melt S. An insulating member 21 constructed as a ring is arranged at the foot end 12 of the pot.

The main electrode 10 is enclosed by a burner lance 30 along its length. This burner lance 30 has a double-walled construction and has an inner pipe 32 and a casing 33. The head end 31 of the burner lance 30 is fastened to the insulating member 21.

Sliding elements 51 are provided between the foot end 35 of the burner lance 30 and the foot part 17 of the main electrode 10.

The foot part 35 of the burner lance 31 is fastened to a quick-closing part 41 of the supporting device 40. The quick-closing part 41 is connected with the media supply 80, not shown in more detail, and has a water feed 81 and a water discharge 82, a main gas feed 84, and a current feed 85.

The media flow is shown by arrows. The main gas flows between a main electrode pipe 18 and the inner pipe 32 of the burner lance 30 and subsequently into the collimator region 63 through bore holes 16 provided at the foot end 12 of the pot.

The cooling water flows through the interior of the main electrode pipe 18 until reaching the head part 11 of the main electrode 10, where it is deflected by baffle plates 14 arranged at the inner wall 13 of the main electrode pipe 18, circles back in the opposite direction, and arrives in the hollow spaces 61 of a nozzle 60 via openings 15 arranged at right angles to the center axis I in the region of the foot end 12 of the pot. The cooling water leaves the nozzle 60 via passages 34 provided at the head end 31 of the burner lance 30. It then leaves the plasma torch through the water discharge 82 in the double wall of the burner lance 30 between the inner pipe and casing 33 at the foot end 35 of the lance.

As shown in the right-hand portion of the drawing, the nozzle 60 can be constructed in the form of a so-called shadow pipe. The insulating member 21 is correspondingly shaped in the interior 61 and has passages 62 and inner pipes 23 for guiding the coolant.

Figure 2:
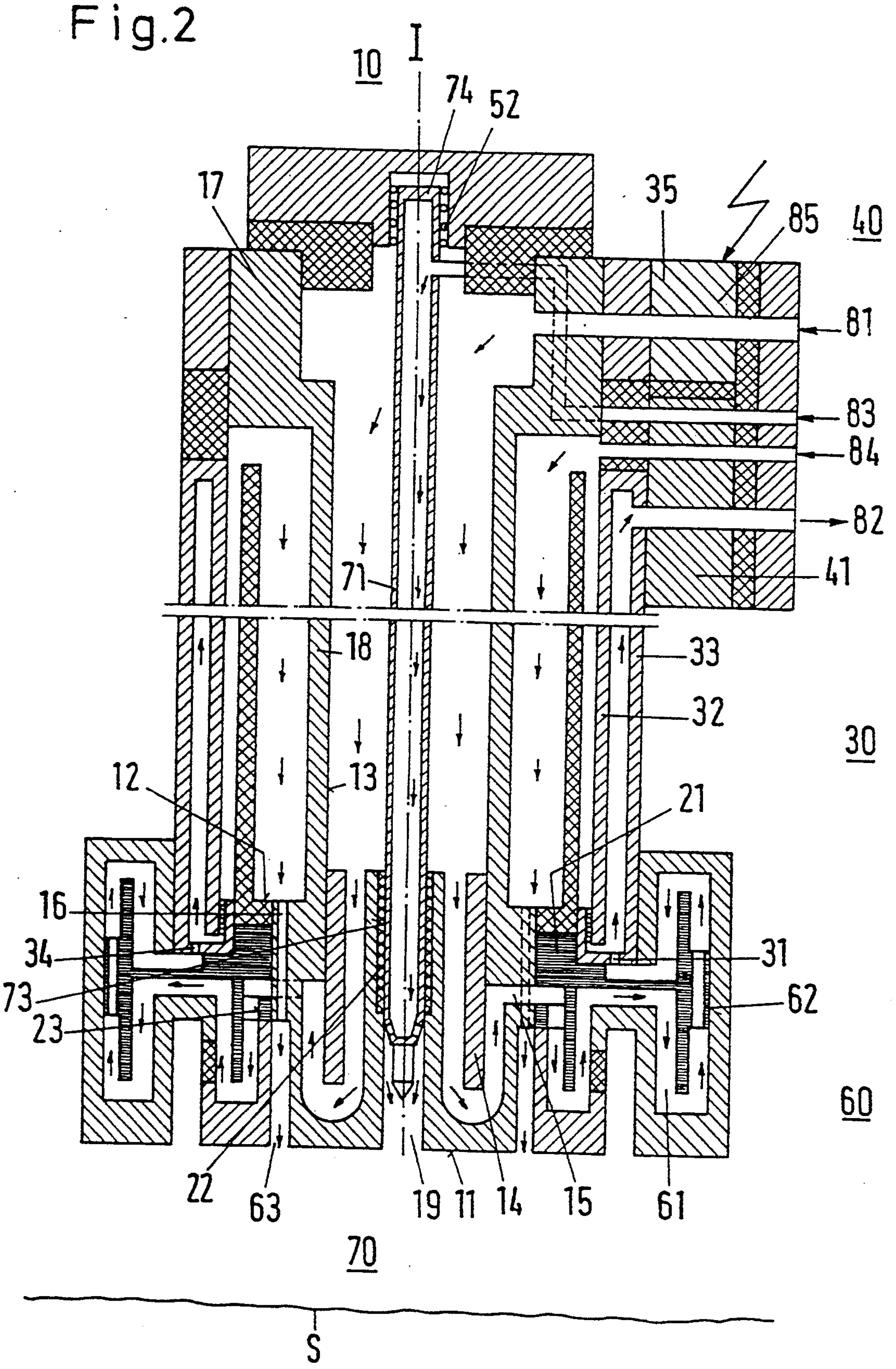
FIG. 2 shows a plasma torch with ignition lance without sliding elements between the burner lance and main electrode.

FIG. 2 shows a plasma torch provided with an ignition electrode 70. In contrast to FIG. 1, this plasma torch is not outfitted with sliding elements 51 between the main electrode 10 and the burner lance 30. An ignition gas feed 83 is provided in addition to the main gas feed 84 of the media supply 80.

The ignition electrode head 73 of the ignition electrode 70 is guided through a central passage 19 of the pot-shaped head part 11 of the main electrode 10. An insulating bush 22 which holds an ignition electrode pipe 71 in a clamping manner is provided between the ignition electrode head 73 and the head part 11 of the main electrode 10. Sliding elements 52 are arranged at the foot end 74 of the ignition electrode pipe 71. The sliding elements 52 are arranged in the foot part of the main electrode pipe 18 and enable a relative displacement between the main electrode pipe 18 and the ignition electrode pipe 71.

Figure 3:
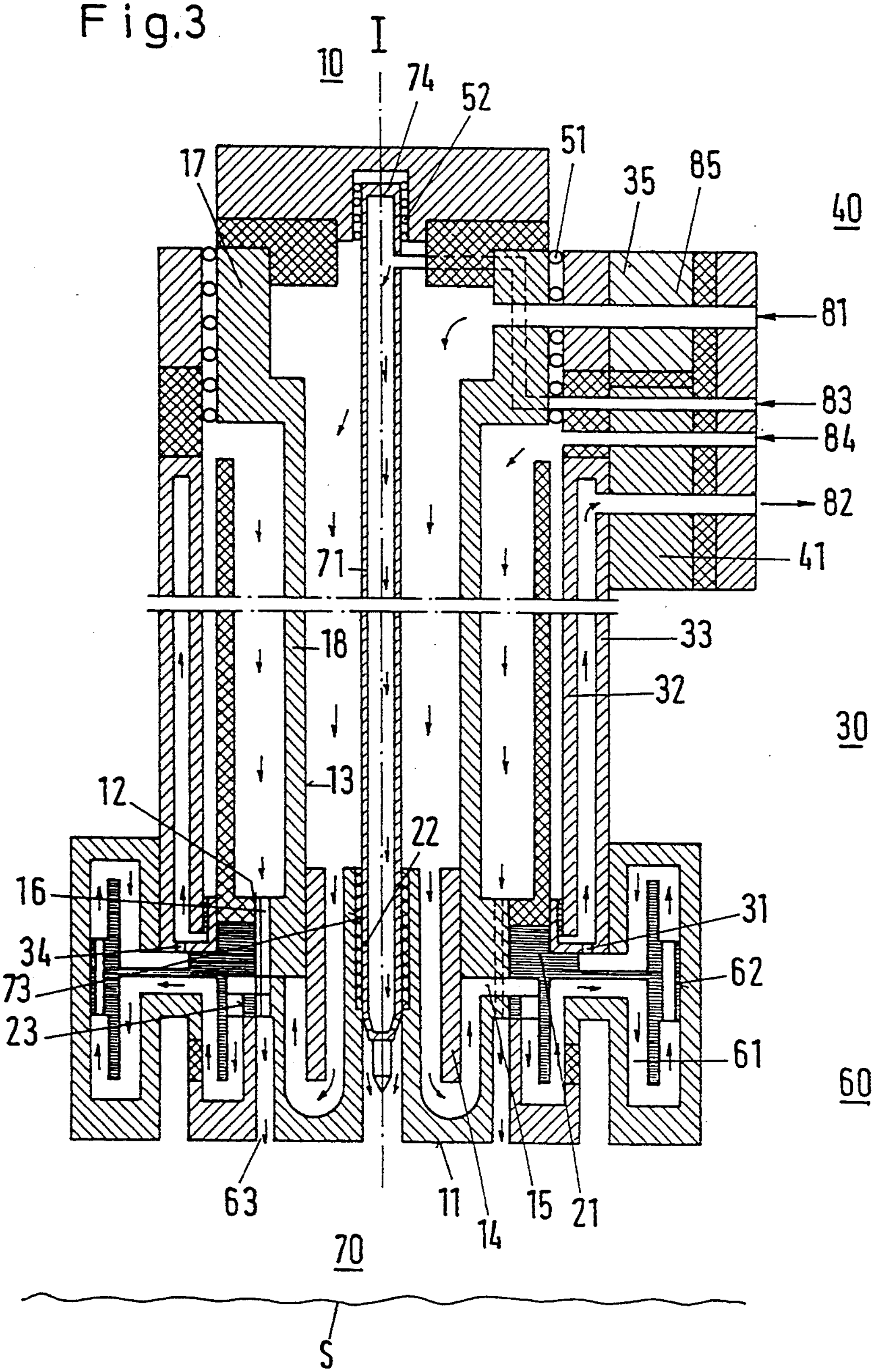
FIG. 3 shows a plasma torch with main electrode and ignition electrode and sliding elements between the main electrode, burner lance and ignition lance.

FIG. 3 shows a plasma torch with a main electrode 10 and an ignition electrode 70, with sliding elements 51 between the foot end 35, the burner lance 30 and the foot part 17 of the main electrode 10, as well as sliding elements 52 between the main electrode pipe 18 and the ignition electrode pipe 71 of the ignition electrode 70.

We claim:

1. A plasma torch, comprising: a burner that projects into a container which can be filled with melt, the burner including a lance with an inner pipe and a casing, and further including a foot end; means for supporting the burner; a nozzle arranged at the burner lance; a main electrode pipe having a head end and being arranged within the burner lance; a main electrode connected to the head end of the main electrode pipe and having a foot end, the main electrode, the main electrode pipe and inner pipe of the burner lance being adapted so as to guide gaseous media to the main electrode between the main electrode pipe and the inner pipe of the burner lance, and so as to feed liquid media and electric current through the interior of the electrode pipe via hollow spaces in the nozzle to the burner lance between the inner pipe and the casing of the burner lance; an annular electrical insulating member provided around the main electrode in region of the foot end of the main electrode so as to annularly enclose the main electrode, the casing of the burner lance being fastened to the insulating member; a thermal insulating member provided at the head end of the main electrode pipe so as to fix the main electrode pipe inside the burner lance; and sliding elements provided so as to support the foot end of the main electrode pipe inside the burner lance to permit movement in an axial direction relative to the burner lance.

2. A plasma torch according to claim 1, wherein the sliding elements are arranged between the burner lance and the main electrode pipe.

3. A plasma torch according to claim 2, wherein the sliding elements are contact springs.

4. A plasma torch according to claim 1, and further comprising connection means at the foot end of the burner lance for connecting cooling media feed, cooling media discharge and gas to the main electrode.

5. A plasma torch according to claim 4, wherein the supporting means includes a quick-closing part provided at the foot end of the burner lance, and media feed lines for water, gas and electric current.

6. A plasma torch according to claim 1, wherein the main electrode pipe has an inner wall, and further comprising a cylindrical baffle plate provided at the inner wall of the main electrode pipe so as to guide coolant within the electrode pipe.

7. A plasma torch according to claim 6, and further comprising a second thermal insulating member provided so as to enclose the main electrode so that the main electrode is separated from the nozzle having hollow spaces for receiving the coolant.

8. A plasma torch according to claim 1, wherein the cylindrical nozzle has an inner wall connected to the first insulating member, the first insulating member being a water guiding plate.

9. A plasma torch according to claim 1, wherein openings are arranged at the foot end of the lance in the inner wall at right angles to a center axis so as to permit outlet of a coolant.

10. A plasma torch according to claim 9, wherein boreholes arranged coaxially relative to the center axis are provided between the openings for guiding a main gas.

11. A plasma torch which projects into a container and can be fastened at a supporting device, comprising: a nozzle; a main electrode; pipe means having coaxially arranged pipes for feeding gaseous and liquid media and electric current to the main electrode; an ignition electrode, the main electrode having a head part with an annular pot-shape form; an insulating bush provided so as to coaxially enclose the main electrode and hold the ignition electrode in a head region; an electrode pipe having one end fastened to the ignition electrode and sliding elements provided at a second end of the electrode pipe remote of the ignition electrode for sliding support relative to the main electrode pipe.

12. A plasma torch according to claim 11, wherein the sliding elements are contact springs.

* * * * *